F. Curtis,

Vegetable Cutter.

No. 108,009.        Patented Oct. 4, 1870.

Witnesses        Inventor
              Francis Curtis,
              per
              Alexander Mason
              Attys.

United States Patent Office.

FRANCIS CURTIS, OF BRATTLEBOROUGH, VERMONT.

Letters Patent No. 108,007, dated October 4, 1870.

IMPROVEMENT IN VEGETABLE-CUTTERS.

The Schedule referred to in these Letters Patent and making part of the same.

*To all whom it may concern:*

Be it known that I, FRANCIS CURTIS, of Brattleborough, in the county of Windham and in the State of Vermont, have invented certain new and useful Improvements in Vegetable-Cutters; and do hereby declare that the following is a full, clear, and exact description thereof, reference being had to the accompanying drawing and to the letters of reference marked thereon, making a part of this specification.

The nature of my invention consists in the construction and arrangement of a "vegetable-cutter," as will be hereinafter fully set forth.

In order to enable others skilled in the art to which my invention appertains to make and use the same, I will now proceed to describe its construction and operation, referring to the annexed drawing, in which—

A represents a board, of any suitable dimensions, provided along its sides with flanges B B, which project downward and inward forming grooves, in which a board or frame, C, is inserted.

This frame C is, along its sides, provided with flanges *a a*, which project upward, so as to form a space between the under side of the board A, and the upper side of the frame C.

Figure 1:
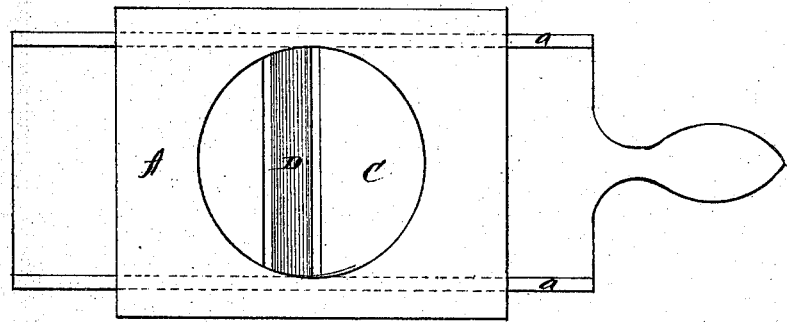
Figure 1 is a plan view.
Figure 2:
Figure 2 is a transverse vertical section of my invention.
Figure 3:
Figure 3 is a longitudinal vertical section of the frame, containing the knife or cutter.

Across the center of the frame C is placed the cutter bar D, which is flat on top, and beveled on the under side from the sides downward toward the center, forming two cutting-edges, as shown in fig. 3.

The ends of the cutter D are let in into the flanges *a a*, and the board or frame C is slotted under said cutter, which slot is wider than the cutter, so as to extend on both sides thereof.

In the board A is a large round aperture, in which the vegetables are held, and then the frame C moved back and forth, the cutter D cutting it when moving in both directions.

In using my invention, the board A is placed upon the table, or other suitable place, the flanges B B forming the rest for the same, leaving a space under the slide C for the vegetables to fall, after they are cut.

An opening may be made under the knife D, for the vegetables to fall below.

The vegetables are placed with the circular opening in the frame A, and held down upon the knife by the operator, while the slide C with its knife is moved forward and backward by the handle at its end.

As the vegetables are cut they are dropped down, or are pushed aside from under the slide, so that it can freely operate.

By these means any vegetables can be cut with ease and quickly, and the operator is not in danger of cutting the fingers on the hand.

What I claim, is—

The board A, with its circular opening and angular flanges B B, through which slides the board C, having flanges *a a* and two-edged knife D, operating under the circular opening, all substantially as set forth, In testimony that I claim the foregoing, I have hereunto set my hand and seal this 1st day of April, 1870.

FRANCIS CURTIS. [L. S.]

Witnesses:
KITTRIDGE HASKINS,
JOHN W. REID.